United States Patent [19]

Manteufel

[11] Patent Number: 4,701,287

[45] Date of Patent: Oct. 20, 1987

[54] APPARATUS FOR THE EXCHANGE OF MATERIAL AND/OR HEAT BETWEEN AND/OR FOR MIXING OF GASEOUS AND/OR LIQUID SUBSTANCES

[76] Inventor: Rolf P. C. Manteufel, Epiceadreef 11, B-2180 Kalmthout-Heide, Belgium

[21] Appl. No.: 770,924

[22] Filed: Aug. 30, 1985

Related U.S. Application Data

[63] Continuation of Ser. No. 505,530, Jun. 17, 1983, abandoned.

[30] Foreign Application Priority Data

Jun. 28, 1982 [BE] Belgium ............................. 893557

[51] Int. Cl.$^4$ ............................................. B01F 3/04
[52] U.S. Cl. ........................................ 261/81; 165/60; 261/106; 261/112
[58] Field of Search ............... 261/104, 107, 112, 81, 261/100, 101, 106; 422/310, 211, 222; 202/158; 165/60

[56] References Cited

U.S. PATENT DOCUMENTS

| | | | |
|---|---|---|---|
| 2,377,527 | 6/1945 | Siefken | 261/104 |
| 2,561,669 | 7/1951 | Macq | 261/81 |
| 2,615,700 | 10/1952 | Dixon | 261/112 X |
| 3,262,682 | 7/1966 | Bredberg | 261/112 X |
| 3,265,550 | 8/1966 | Lindquist | 261/112 X |
| 3,466,151 | 9/1969 | Sicard et al. | 261/112 X |
| 3,778,042 | 12/1973 | Schade et al. | 261/106 X |
| 3,785,620 | 1/1974 | Huber | 261/112 X |
| 3,811,661 | 5/1974 | Procter | 261/107 X |
| 4,128,684 | 12/1978 | Bomio et al. | 261/112 X |
| 4,300,925 | 11/1981 | Nikandrov et al. | 261/106 X |
| 4,324,749 | 4/1982 | Bronner | 261/112 |

FOREIGN PATENT DOCUMENTS

| | | | |
|---|---|---|---|
| 642919 | 9/1950 | United Kingdom | 261/100 |
| 729587 | 5/1955 | United Kingdom | 261/100 |

*Primary Examiner*—Richard L. Chiesa
*Attorney, Agent, or Firm*—Beveridge, DeGrandi & Weilacher

[57] ABSTRACT

An apparatus is disclosed for the exchange of substances and/or heat between and/or mixing of gaseous and/or fluid substances wherein the flowing substances are guided repeatedly through permeable walls (1, 2, 3 and 4) running essentially parallel to the direction of the main flow (14 and 17). According to the apparatus, this will be achieved by the spacing means (5) of lesser permeability which are disposed alternately in the flow channel (13) between the permeable walls (1, 2, 3 and 4). The permeable walls preferably consist of fabrics which are placed in movement or into oscillation by the flowing media. For a more effective exchange, the walls are provided with areas (1, 2, 3 and 4) of variable density of fabric, whereby the denser areas are preferably located near the spacing means (5).

21 Claims, 10 Drawing Figures

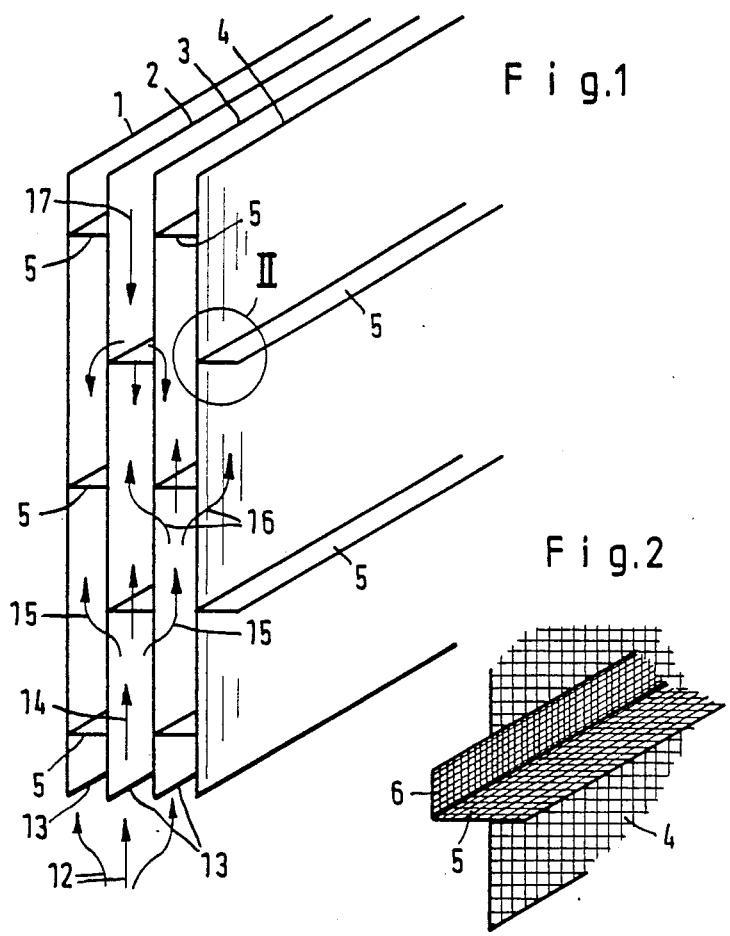
Fig.1
Fig.2
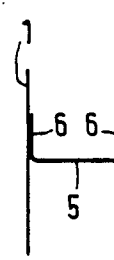
Fig.3
Fig.4
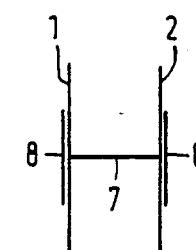
Fig.5
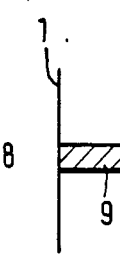
Fig.6
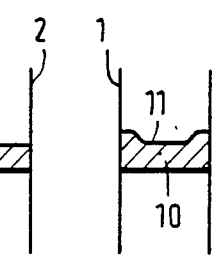
Fig.7

APPARATUS FOR THE EXCHANGE OF MATERIAL AND/OR HEAT BETWEEN AND/OR FOR MIXING OF GASEOUS AND/OR LIQUID SUBSTANCES

Reference to a Related Application

This application is a continuation of my copending application Ser. No. 505,530 filed June 17, 1983, now abandoned, which is relied on and incorporated by reference.

The invention relates to a process for the exchange of material and/or heat and/or for mixing of gaseous and/or liquid substances wherein the substances are conducted in continuous cocurrent or countercurrent flow essentially in a primary direction of flow through a space subdivided into a multiplicity of flow paths. The invention relates furthermore to structures for arrangement in apparatus for carrying out such exchange processes.

In the case of material and heat exchange, the gases and/or liquids which are led in cocurrent or in countercurrent flow, must be brought into contact with one another as intensively as possible and then must be separated again in order to make do with the minimum possible amount of apparatus. In practice, this is accomplished by special built-in structures which however distinctly fulfill the known conditions of an optimum material and heat exchange. The greater the exchange surfaces for materials and heat, and the concentration or temperature differences of the gases and/or liquids which are guided in cocurrent or countercurrent flow, the more effective will be the structures.

In case of industrial apparatus with more or less large dimensions, it is difficult to guide the streams of material in cocurrent and countercurrent flow so evenly through the structures so that no large-scale intermixtures and as a result necessarily back mixings occur, which degrade the concentration and temperature differences and thus the effectiveness of the structures.

For this reason, the hitherto used random filler beds and the bottom columns operated with cross current flow have been used less and less, and the oriented packings of various kinds are substituted which guarantee a higher throughput with lower loss of pressure. The greater the surface in case of these packings and thus also the number of the flow channels, the more difficult will be the even distribution of the media guided in the cocurrent or countercurrent flow. The terminal velocity of liquids is indeed so great that the streams of customary liquids used in material and heat exchange processes are not capable of acting evenly upon the entire cross sectional surface of the apparatus. Either only a limited number of discharge points is possible, or the fluids must be atomized.

In the case of the variable sizes and distributions of drops occurring hereby, no even sprinkling of the cross sectional surface occurs. Because of this faulty application of fluid however, it will not be sufficient merely to distribute the fluid over the built-in structures, but these structures themselves will have to take care of the material distribution for an improvement in the entire exchange program by an even wetting and by equal losses of pressure in every individual flow channel.

It has been known to evenly divide the apparatus volume by the use of arranged packings with parallel and corrugated walls, and also to use fabrics of various types for this purpose, in order to achieve large surfaces and good wetting characteristics. In case of large surfaces and therefore a large number of parallel webs of fabrics, good wetting however will not be sufficient by itself in order to achieve the needed transverse distribution of fluids over the entire flow cross section. These types of fabric packings are therefore provided with serations or corrugations, running diagonally to the axis of the column, and which take care of a lateral distribution of the fluid over the entire flow cross section. On the other hand, this forced guidance of the fluid through the corrugations slanted outwards, leads to the undesirable lateral direction of flow of the streams of fluid guided through the apparatus, which could not be balanced out either by individual packings that are disposed in a twisted relation to one another. Thus, even in the case of these types of packings, repeated new charges of the fluid by additional fluid distributors are required.

While in the case of known fabric packings, the fluid is distributed over the surfaces of the fabric and the gases are more or less conducted past these surfaces with the empty pipe velocity, when filler beds and especially bottom columns are used, the velocities are greater as a result of the cross sectional restrictions than the velocity through an empty pipe. This leads to an increased loss of pressure in the case of all these exchanger types.

In order to avoid these disadvantages and in order to achieve flow conditions that are as even as possible, it will be necessary for the built-in structures to be rotation-symmetrical and they must have flow channels of equal size. Furthermore, for the achievement of a small loss in pressure, no accelerations as compared to the velocity through the empty pipe must arise or in other words, the flow cross sections must not be constricted as in the case of known built-in structures. The invention is based on the object of creating a process and an apparatus of the initially described type which make possible an optimal material and heat exchange in the smallest possible space and while avoiding considerable losses in pressure.

This object is provided according to the process of the invention through the fact that the flowing substances are conducted repeatedly through permeable walls running essentially in parallel to the main direction of flow. In the case of a preferred embodiment of the process, walls of non-rigid fabric are used which are subjected to movement by the fluctuations in pressure of the flowing substances and/or are placed into oscillations thereby.

It has been found that in the case of exchange surfaces disposed in several layers in parallel to the longitudinal axis or to the direction of the main flow, as a result of the apparatus, the flow velocity through these structures is less than the velocity through the empty pipe of the media guided through the apparatus. With the number of the permeable surfaces disposed in parallel to the main direction of flow, the flow velocities decrease as a result of these surfaces and thus the losses of pressure also decrease. As a result of that, the throughput at equal loss of pressure is greater; that is, the media may be simultaneously guided back and forth in transverse distribution in several stages in passage through the exchange surfaces disposed side by side, without any impermissibly high losses of pressure occurring. Thus, higher separating step values per unit of length of the apparatus will be achieved at low losses of pressure.

In the case of the process of the invention, the fluid media guided in individual streams through the apparatus will flow alternately through permeable walls disposed in parallel to the main stream. Because of the porosity of these walls as well as their subdivision, the streams of substance permeate each other and repeated compensation of volume adjacent spaces occurs. As a result of this alternating flow-through of adjacent spaces, a so-called braiding flow takes place of the substances guided through the apparatus in cocurrent or countercurrent flow with the desired cross mixing effect. As a result of this, a balance of originally uneven charges of the entire cross section of the apparatus and thus an optimum exchange of material and/or heat will be brought about. As used herein, the term "fluid" is intended to encompass liquids and gases.

Beyond that, it is particularly advantageous to use fabrics which are non-rigid per se, which are subjected to movement by the fluctuations in pressure of the gas and/or liquid flows occurring and are put into oscillations as a result of which an improvement of the material and/or heat exchange may be achieved without additional expenditure for apparatus and power.

The stated object is achieved by way of construction of an arrangement for the disposition in apparatus for the material and/or heat exchange between and/or for mixing of gaseous and/or liquid substances consisting of built-in structures subdividing the inside space of the apparatus into a multiplicity of interconnected chambers of flow paths which are characterized according to the invention by the fact that these structures are formed of permeable walls running essentially in the direction of the main flow and oriented side by side in several layers which walls are kept at a distance from one another by essentially continuous spacing means running essentially transversely to the main direction of flow, which spacing means are always disposed alternately at opposite sides of a wall.

The porous or permeable walls running essentially in the direction of the main flow at the same time need not be formed flat in themselves. They may, for example, have bulges formed transversely to the main direction of flow which then at the same time represent the corresponding spacing means in relation to the adjacent wall. In this case, the spacing means itself consists of permeable materials. The bulges are developed effectively and alternatingly in the direction of opposite sides of a wall, whereby the bulges of adjacent walls always make contact. Such an arrangement results for example also, whenever the individual walls have a zigzag-shaped course in the main direction of flow and contact each other always at their most extreme points, so that a type of honeycomb structure in overall cross section results. Naturally, at the same time, functionally equivalent variations are contemplated.

On the other hand, the spacing means may also be formed as spacing strips extending in a standard plane that is normal in relation to the main direction of flow, which always run between two adjacent permeable walls which in this case may be disposed and developed essentially flat and in parallel to one another. These spacing strips may consist either of a material which is impermeable to flow substances, or else even of permeable wall material.

The permeable walls may consist either essentially of flat surfaces, but it will be more effective in many cases, to dispose them concentrically in relation to the main direction of flow.

In the case of a preferred embodiment, the walls and possibly also the spacing means, insofar as they represent separate construction parts from the walls, consist of a flexible, permeable material which, in turn, preferably is a fabric. Such flexible walls are attached with their ends at corresponding frames and may be stretched in the main direction of flow of the apparatus to the extent necessary, through the movement of these frames in an opposite direction.

Whereas in the case of non-flexible walls, adjacent walls need not absolutely be interconnected by way of spacing means, since the distance may be kept by placing adjacent walls against each other, it will be necessary generally in the case of flexible formation of the walls to connect adjacent walls with one another by means of flexible spacing means, since in the case of a stretching of flexible walls, the mutual distance may be kept best by a certain tensile stress at the spacing means. This is true also for a zigzag-shaped arrangement of the walls. For this purpose, it will be necessary to interconnect adjacent, flexible walls mutually at a distance so that by additional transverse tensioning, the desired honeycomb structure will result in the erect state of the arrangement.

Permeable walls of a certain flexibility also offer the advantage in regard to built-in structure, that they may be wound up with the insertion of suitable spacing means in a spiral shape for the formation of the apparatus. As a result of that, one will obtain an almost concentric arrangement of the walls. It may be particularly advantageous for the production of an apparatus wound up spiral-shaped to use a double layered web of the permeable wall material, which web is provided with spacing means between the two layers and which moreover has additional spacing means displaced on an outside surface in parallel to these spacing means. Such a double web which may be wound up may also consist of two webs attached to one another with the above mentioned zigzag cross section.

In the case of wall materials or fabrics with continuously equal porosity or width of loop, optimum material and/or heat exchange conditions however will not yet be achieved. Therefore, provision has been made according to an additional, preferred embodiment of the invention, that the premeable wall material has areas of variable permeability. With permeable material of continuously equal porosity or width of the loop, a good transverse distribution of the streams of substance, complete wetting of the surfaces of the fabric and low losses of pressure of the continuous phase cannot, indeed, be achieved optimally at the same time. Thus, fabrics with narrow loops have better wetting characteristics and thus better cross distribution and separation effects than fabrics with wide loops, on the other hand, they have relatively high pressure loss. Wide loop fabrics with smaller pressure loss on the contrary generally have worse wetting characteristics and as a result also worse cross distribution and separation effects. The conflicting requirements may therefore not be fulfilled without difficulty with the known types of fabric.

In order to come closer to a great extent to these requirements, according to the invention, areas of lesser wall permeability are provided directly in the area of the spacing means. Whenever the spacing means themselves are of a permeable material, then they must likewise exhibit this lesser permeability. Such an arrangement has the advantage that as a result the fluid media are held back by steps in such a manner that repeated horizontal, transverse distributions of the fluids and at the same time a flow-through of the walls takes place at small pressure loss.

In accordance with the invention, a new distribution of the liquid takes place step by step in one as well as in the other cross sectional axis and is repeated regularly in case of a rotational-symmetric structure of the apparatus contents. Uneven charges of fluid are balanced out in one respect within the dammed up layers of fluid itself and in another respect by a larger discharge of fluid from more highly dammed up layers of fluid of the side by side arrangement flow channels. As a result of the multiplicity of flow cross sections of equal size and as a result of the steps disposed above and beside one another, there occurs a comparative modification of the flow condition over the entire cross section of the apparatus. This is true also for the gas phase flowing through the apparatus and through the permeable walls, since in the case of variable flow volumes, variable losses of pressure and, connected therewith, variable pressures must occur in the flow channels disposed side by side, which however is not possible as a result of the interconnected permeable spaces. As a result of the type of arrangement of the built-in structures according to the invention in an apparatus, as far as flow is concerned this has a self-regulating and equalizing effect so that no variable flow conditions of the fluids and gases may occur in the apparatus over larger areas.

The permeable fabrics or technical textiles disposed in several layers side by side may also be gathered into a filling and may be moved back and forth by a mechanical drive in the apparatus so that an additional axial flow is produced and a transverse mixing occurs which is particularly advantageous for example in case of more highly viscous substances.

In order to carry out chemical reactions, the permeable walls may consist of catalytic material or may have a catalytically acting coating.

In the perferred use of fabrics for the apparatus according to the invention, it is possible to achieve areas of variable permeability of the walls or of the spacing means by a fabric structure that changes at intervals, that is, to say by a loop width changing at intervals. Another effective method resides in applying sections or strips of a more dense fabric, that is to say, of a fabric with tighter loops to a more coarse looped basic fabric for producing areas of lesser permeability.

The selection of the type of fabric depends essentially on the purpose of its use; that is to say, it depends on the substances with which the fabric comes into contact in the material exchange apparatus. Thus, depending on the specific type of application, for example, fabrics of synthetic fibers or glass fibers, cotton fabrics, and also fabrics made of metal are suitable.

Preferred loop widths for the area of the fabric of higher permeability range from about 1 to about 5 mm, while the loop widths for the areas of fabric of lesser permeability range from a tightly woven fabric up to a diameter of the loop with of about 2 mm.

The distances between the permeable walls are selected preferably from about 3 to about 25 mm, while the perpendicular intervals between two oppositely directed spacing means on a wall preferably range from 20 to about 100 mm.

In connection with the process, it had already been mentioned that the flexible formation of the permeable walls preferred in the form of a fabric offers the particular advantage that said fabric itself is brought into motion or oscillations in the case of the tension required for the built-in structure as a result of the pressure fluctuations which generally always occur, and the oscillations or movement further improve the effect of the apparatus according to the invention.

BRIEF DESCRIPTION OF THE DRAWINGS

In the following, the invention will be explained in more detail on the basis of the attached figures of the drawing.

FIG. 1 is a schematic representation of an apparatus according to the invention comprising a packet of perpendicular permeable walls which are alternatingly interconnected by horizontally disposed, permeable spacing ribbons;

FIG. 2 is a representation of the detail of area II in FIG. 1;

FIGS. 3 to 7 show various forms of embodiments of the arrangement of the spacing ribbons in connection with wall areas of lesser permeability;

DETAILED DESCRIPTION OF THE DRAWINGS

Figure 8:
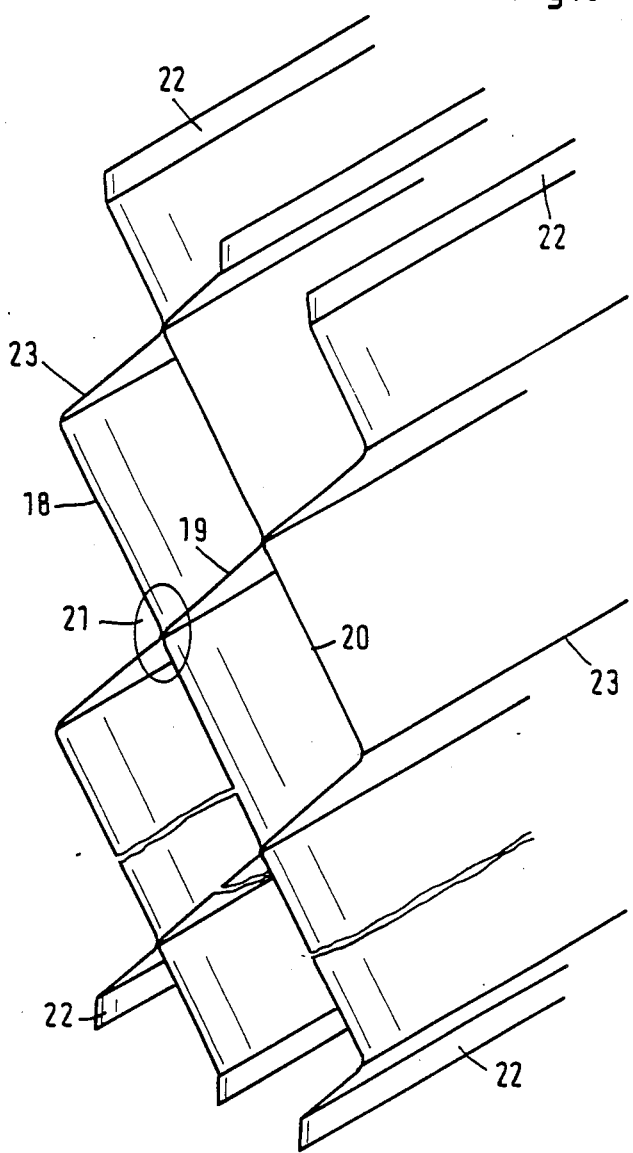
FIG. 8 is a different embodiment of the apparatus according to the invention, wherein the permeable walls have a zigzag-shaped configuration in perpendicular direction and are held in connection with one another at a certain distance at places which always adjoin each other.

Therefore, it is a feature of the invention to provide a process for contacting at least two fluids in cocurrent or countercurrent flow comprising conveying a first fluid in a main direction of flow, and conveying a second fluid in a parallel direction of flow, either cocurrent or countercurrent to said first fluid, and wherein the first and second fluids pass through a space subdivided into a multiplicity of flow paths in such a manner that the flowing fluids are guided repeatedly through permeable walls thereby enabling exchange of material and/or heat between and/or for mixing of gaseous and/or liquid substances.

A further feature of the invention resides in an apparatus for arrangement in a fluid exchanger or mixer comprising a plurality of wall surfaces essentially parallel with the direction of flow of said fluid or multiplicity of fluids and a plurality of surfaces disposed at an angle to said wall surfaces thereby forming a multiplicity of interconnected chambers or flow paths, wherein said surfaces are permeable walls running essentially in the direction of the main flow and disposed in several layers side by side, which walls are kept at a distance from one another by essentially continuous spacing means running essentially transversely to the main flow direction, which spacing means are disposed alternately at opposite sides of a wall and may be of less permeability than the walls.

Described in further detail, FIG. 1 is a section of a component apparatus according to the invention shown as a schematic perspective representation, as it is provided for insertion in an apparatus for material and/or heat exchange. As part of the component apparatus, a number of permeable walls 1, 2, 3 and 4 disposed perpendicularly are shown, which are kept at a certain distance from one another by the spacing ribbons 5.

It will be understood by the expert in this art that an arrangement of the type shown herein, in the form of a component package, is built into a container for an apparatus for material or heat exchange, in a manner to fill essentially the entire cross section thereof.

Exchanger apparatus of this general type are conventional in the chemical industry and are used, for example, for chemical reactions of a wide variety; e.g. for distillation of mixtures, for extraction and for corresponding basic operations of chemical process engineering. The substances to be subjected to the desired treatment are introduced in general into the exchanger apparatus at its upper end or lower end through which apparatus they are then guided in an essentially perpendicular main direction of flow in cocurrent flow or in countercurrent through the inside space of the exchanger container, which for example is filled by an insert corresponding to the component apparatus according to the invention. Generally, distributing arrangements for the substances introduced and known to the expert are provided at the charging ends of the exchanger which are to ensure that the substances initially will be evenly distributed to the greatest extent possible over the entire cross section of the exchanger apparatus.

It will be apparent to for the expert that the apparatus according to the invention shown according to the embodiment, for example in FIG. 1, does not merely consist of the number of permeable walls and spacing strips shown there, but that the number of the elements is selected in such a way that they essentially completely fill the cross section of the exchanger apparatus in which they are inserted. Depending on the shape or formation of the container, the package-like inserts may have concentrically disposed permeable walls, but also walls disposed in parallel in the shape of plates. It will furthermore be clear to the expert that depending on the material of which the permeable walls and distancing means are made, corresponding frames or supports may be provided on top and on the bottom in the exchanger container on which the walls are attached with their terminal edges. This is necessary especially, whenever dealing with the case of permeable walls made of flexible material, which must be attached and clamped down on both sides in order to fix their corresponding position in the container.

The permeable walls 1, 2, 3 and 4 shown in the embodiment of FIG. 1 consist for example of a fabric made of synthetic fibers or wires with a loop width or mesh between 1 and 5 mm. The spacing ribbons 5 may also consist of a fabric, which for example is glued together or connected in some other way with the fabrics of the walls 1, 2, 3, and 4. In FIG. 2, by way of a sectional view, a connecting point between the spacing ribbon 5 and the wall 4 is shown. As may be seen from this figure, the spacing ribbon 5 is oriented upwards along its edge of contact and it forms a flange strip 6 which, with the permeable wall 4, is connected in a suitable way and manner, for example, by welding or gluing together. A corresponding connection with the other edge of the spacing ribbon 5 may also exist on the succeeding permeable wall.

In the case of a preferred embodiment of the invention, the permeable walls have areas of variable permeability. Correspondingly, as becomes clear from FIG. 2, the spacing ribbon 5 in the case of this embodiment and with it also the flange strip 6, has a lesser loop width than the basic fabric of the permeable wall 4. The flange strip 6 applied to the coarse mesh basic fabric of the permeable wall 4 thus forms such an area of lesser permeability of the permeable wall 4. The spacing ribbon 5 with the flange strip 6 may, for example, consist of a densely made fabric with warp and filling threads lying essentially side by side, but it may also have inside loop width up to about 2 mm. As will be explained in still more detail in the following passages, the areas of lesser permeability of the walls 1, 2, 3 and 4 are provided preferably in the area of the spacing ribbons 5.

In FIGS. 3–7, various embodiments of the essential structure of two permeable walls 1 and 2 with a spacing ribbon disposed therebetween are shown in schematic cross section. The form of embodiment of FIG. 3 corresponds essentially to the illustration according to FIG. 4, wherein however the flange strips 6 directed upwards are seen at both sides of the spacing ribbon 5. In the embodiment according to FIG. 4, the spacing ribbon 5 had been reversed in practice by its lateral flange strip 6 not extending upwards but downwards.

In FIG. 5, an embodiment is shown where a spacing ribbon 7 without flange strips is attached directly with its lateral edges to the adjoining walls 1 and 2. On the outside of walls 1 and 2, additional fabric strips 8 have been applied which, like the flange strips 6 in the case of the preceding embodiments, consist of a narrow-meshed fabric as compared to the coarse meshed basic fabric of the walls 1 and 2. The embodiment according to FIG. 5 in practice represents a combination of the embodiments according to FIGS. 3 and 4 by the areas of lesser permeability of the walls extending upwards as well as downwards from the spacing ribbon 7. The selection of the various embodiments depends on the field of use for the corresponding apparatus.

In FIGS. 6 and 7, two additional embodiments are shown wherein the spacing ribbon is not formed of a fabric but is formed of a massive, permeable strip of materials 9 or 10. Areas of lesser permeability of the walls 1 and 2 may also be provided in the case of these embodiments according to need. The spacing ribbon 10 in FIG. 7 at its upper side shows a funnel-shaped depression 11. Such a depression may be effective whenever, for example, a fluid accummulation is desired in the case of flow stream through the apparatus.

In further detail, FIG. 1 shows flow arrows by way of example in order to explain the permitted course of flow through the apparatus.

Assuming that a gas stream 12 is introduced into the apparatus from below, it is distributed by conventional means not shown, as evenly as possible over the individual flow channels 13 of the apparatus. Since the spacing ribbons of slight permeability which, for example, may be enlarged further by wall areas of lesser permeability, as shown in FIG. 5, represent a partially increased flow resistance for the rising gas, the middle stream portion 14 divides itself into two lateral partial streams 15 which divided streams pass through the permeable walls 2 and 3 and continue in the adjacent flow channels. A corresponding sequence is shown for the partial streams 16.

Since this characteristic applies for every point of the apparatus, an overall cross mixing and equalization of the entire flow by the apparatus occurs. For this it is important that the spacing means or spacing ribbons 5 are always disposed in a displaced or staggered relationships to one another in adjacent flow channels. Correspondingly in the embodiment of FIG. 1 given by way of example, a stream portion 17 of fluid entering from above is shown for which the spacing ribbons 5 on the one hand causes a damming effect on the flow, which likewise causes the fluid to be distributed in the pertinent adjacent channels and on the other hand represent together with any possible wall areas of higher mesh density, an area which represents an increased wetting of the wall with liquid. In summary, the operation of the apparatus is explained in detail in the introductory portion hereof.

FIG. 8 shows another preferred embodiment of the apparatus of the invention wherein the permeable walls 18, 19 and 20 exhibit in a perpendicular direction a zigzag-shaped form. At their points of contact, of which one is emphasized especially by the circle 21, the permeable walls are interconnected. Special spacing means are omitted in this case, since in this embodiment, the bulging corners of the walls 18, 19 and 20 themselves serve as spacing elements. Since in this case, no special spacing parts are present which could be formed with a different permeability, in this case, if necessary, the permeable walls themselves would have to be made with a different permeability in the connecting areas 21. On the upper and lower ends of the walls 18, 19 and 20, strip-like edges 22 are shown by which the walls are supported or may be clamped in a corresponding frame.

As material for the walls, one may provide a fabric or a sieve material which on the one hand has a sufficient natural stiffness in order to retain the desired shape by itself, and on the other hand however will be so elastic that it will be put into certain oscillations through the flow passing through it. In contrast, whenever such an embodiment is produced using a soft non-self supporting fabric, then an additional clamping down at the outside edges 23 of the outermost walls is required, in order to maintain the system in a honeycomb-shaped state.

Figure 9:
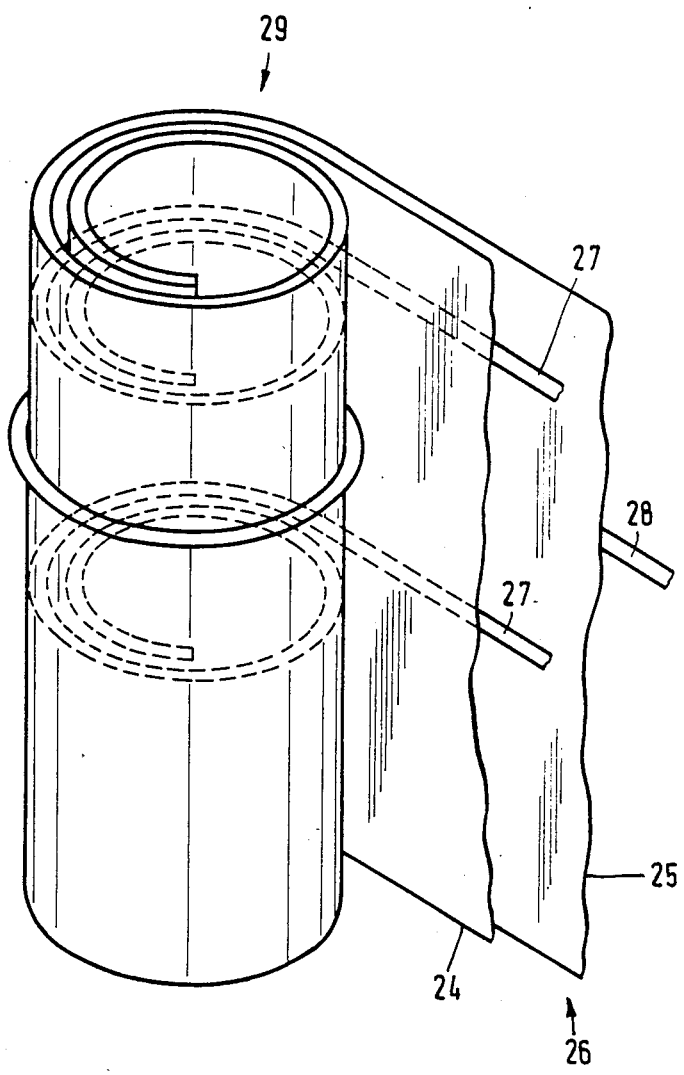
FIG. 9 shows an embodiment corresponding essentially to the embodiment according to FIG. 1 of the apparatus according to the invention, in an essentially concentric arrangement which has developed as a result of a spiral winding of a double layered web of the permeable wall material with corresponding spacing ribbons.

A technically different embodiment of the apparatus according to the invention which makes possible in a simple way an essentially concentric arrangement of the permeable walls is shown schematically in FIG. 9. The apparatus there is wound from a double layered web 26 for permeable walls, which consists of two individual walls 24 and 25 which are interconnected by spacing ribbons 27. Moreover, spacing ribbons 28 are additionally provided on the outside of the web 25 which are disposed in a displaced relation to the spacing ribbon 27. The formation of the apparatus from a double layered web of wall material is required, because in the case of a single layer with spacing ribbons, said spacing ribbons would always come to lie on the same height of the layer and would exclude a mutually displaced arrangement which is essential for the method of functioning.

In case that the permeable walls 24 and 25 of the winding body 29 consist of a soft, non-rigid material, the individual layers of the wound body would naturally also have to be clamped down correspondingly at their ends.

However, for the embodiment shown, a wall material which is sufficiently stiff in itself is preferred, for example, in the form of a metal fabric. The spacing ribbons 27 at the same time are produced effectively from sufficiently stiff material which is still elastic enough for the winding and which in the case of this type of embodiment does not absolutely have to be permeable.

Figure 10:
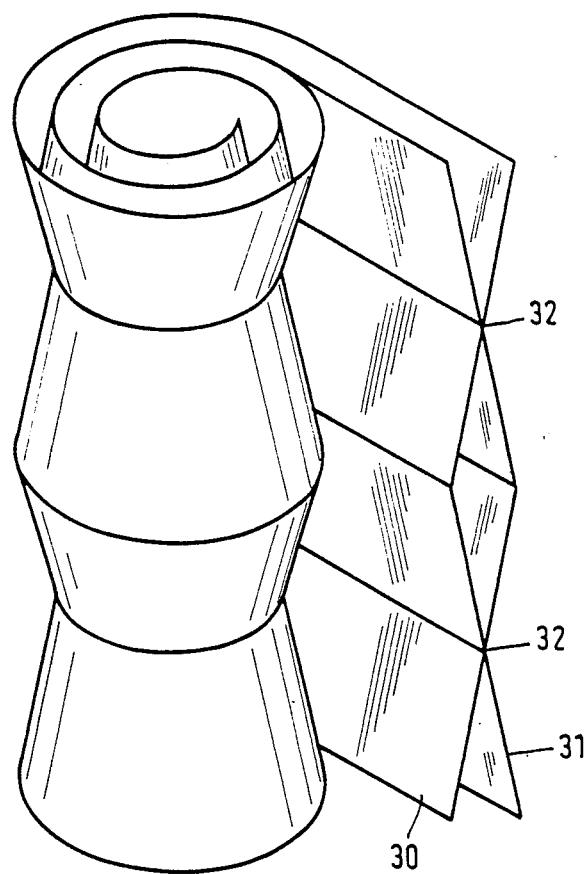
FIG. 10 shows an embodiment of the apparatus according to the invention corresponding essentially to the embodiment of FIG. 8, wherein a double layered web of the permeable wall material is wound up in a spiral form, whereby the spacings between the walls inherently occur as a result of the zigzag-shaped form of the web material.

FIG. 10 shows schematically a corresponding winding arrangement for a double layered web with zigzag course similar to the embodiment according to FIG. 8. In this case, too, it is necessary to make the web that is to be wound up in double layers with an opposite zigzag course of the individual layers, since otherwise, the chambers between the permeable walls 30 and 31 would not develop. The webs 30 and 31 are interconnected at the same time at their points of contact 32. The wall material should have sufficient natural stiffness in order to impart enough stability to the entire wound body, but it also should be sufficiently moldable in order to make the winding up possible despite the special shaping. Metal webs are suitable for this purpose, for example.

Further variations and embodiments of the present invention will be apparent to those skilled in the art from the foregoing and are intended to be encompassed by the claims appended hereto.

I claim:

1. An apparatus for arrangement in a fluid exchanger or mixer, comprising:
   a plurality of walls essentially parallel with the direction of flow of said fluid in said apparatus, wherein said walls are permeable walls disposed in several layers side by side, which walls are kept at a distance from one another by essentially continuous spacing means located alternately at opposite sides of each of said walls thereby forming a multiplicity of interconnected chambers, said walls each having bulges or protuberances forming the spacing means between each of said walls, such that each of said walls is in the form of an endless ribbon of a corrugated surface;
   each of said walls having areas of variable permeability such that the areas adjacent to areas of contact between adjacent walls are less permeable and wherein the areas of lesser permeability consist of tightly meshed sections of fabric which are put onto a more coarse meshed web material forming said walls.

2. The apparatus as in claim 1, wherein the walls consist of flexible material and are supported at their ends and are fastened.

3. The apparatus as in claim 2, wherein the support of the walls forms a frame closed within itself, which is attached to means for reciprocal movement of the apparatus.

4. The apparatus as in claim 3, wherein the upper and lower support for the walls are connected to form a unitary construction that enables a mechanical back and forth movement of the apparatus.

5. The apparatus as in claim 3, wherein the walls consist of a textile fabric.

6. The apparatus as in claim 1, wherein the permeable walls consist of a catalytic material or are provided with a catalytically acting coating.

7. An apparatus for arrangement in a fluid exchanger or mixer, comprising:
   a plurality of walls essentially parallel with the direction of flow of said fluid in said apparatus, wherein said walls are permeable walls disposed in several layers side by side, which walls are kept at a distance from one another by essentially continuous spacing means located alternately at opposite sides of each of said walls thereby forming a multiplicity of interconnected chambers, said walls each having bulges or protuberances forming the spacing means between each of said walls, such that each of said walls is in the form of an endless ribbon of a corrugated surface;

each of said walls being formed of a permeable fabric having areas of variable permeability such that the areas adjacent to areas of contact between adjacent walls are less permeable with the difference in permeability being directly related to changes in loop width of the fabric forming said walls.

8. The apparatus as in claim 7, wherein the walls consist of a flexible material and are supported at their ends and are fastened.

9. The apparatus as in claim 8, wherein the support of the walls forms a frame closed within itself, which is attached to means for reciprocal movement of the apparatus.

10. The apparatus as in claim 9, wherein the upper and lower support for the walls are connected to form a uniform construction that enables a mechanical back and forth movement of the apparatus.

11. The apparatus as in claim 9, wherein the walls consist of a textile fabric.

12. An apparatus for arrangement in a fluid exchanger or mixer comprising a plurality of walls essentially parallel with the direction of flow of said fluid in said apparatus, wherein said walls are permeable walls disposed in several layers side by side, said walls having a corrugated or zig-zag shape such that an inwardly extending portion of one wall contacts an outwardly extending portion of an adjacent wall and said walls being secured to one another by way of connecting means which act to secure said walls to one another at least at several points whose locations extend transversely to the main direction of fluid flow essentially across the full width of said walls, said connecting means being positioned alternatively at opposite sides of a wall thereby forming a multiplicity of interconnected chambers; and apparatus further comprising strips of a permeable fabric secured to each of said permeable walls in the general area of said connecting means, with the securement of said strips resulting in the permeability of said walls in the general area of said connecting means being less than the permeability of said walls outside the general area of said connecting means.

13. An apparatus as recited in claim 12 wherein said connecting means connects said outwardly extending portion to said inwardly extending portion in such a manner as to create a series of diamond shaped interconnected chambers between said adjacent walls.

14. An apparatus as recited in claim 13 wherein said strips are positioned on alternating sides of each of said walls in a sequence that places each of said strips slightly above and on the outside of the low apex of each of said diamond shaped interconnected chambers.

15. An apparatus as recited in claim 12 wherein said walls are formed from synthetic fibers.

16. An apparatus as recited in claim 12 wherein said walls are formed of a metallic fabric.

17. An apparatus as recited in claim 12 wherein said walls and said strips are formed from synthetic fibers.

18. An apparatus as recited in claim 12 wherein said walls and said strips are formed of a metallic fabric.

19. An apparatus for the arrangement in a fluid exchanger or mixer comprising a plurality of walls essentially parallel with the direction of flow of said fluid in said apparatus, wherein said walls are permeable walls disposed in several layers side by side, said walls being secured to one another by way of connecting means which act to secure said walls to one another at least at several points whose locations extend transversely to the main direction of fluid flow essentially across the full width of said walls, said connecting means positioned alternatively at opposite sides of a wall thereby forming a multiplicity of interconnected chambers, said connecting means consisting of a permeable spacing ribbon having one side perpendicularly attached to a second of said walls so as to form a horizontal plane between said walls which is transverse to the direction of fluid flow, said connecting means being formed of a fabric having a maximum loop width of about 2 mm, and said walls being formed of a fabric having loop widths from about 1 mm to 5 mm such that the permeability of said walls in the general area of said connecting means is less than the permeability of said walls outside the general area of said connecting means.

20. An apparatus as recited in claim 19 wherein said fabric forming both said walls and said spacing ribbon is metallic.

21. An apparatus as recited in claim 19 wherein said fabric forming both said walls and said ribbon is composed of synthetic fibers.

* * * * *